United States Patent [19]
Bull

[11] Patent Number: 6,141,649
[45] Date of Patent: Oct. 31, 2000

[54] METHOD AND SYSTEM FOR TRACKING EMPLOYEE PRODUCTIVITY VIA ELECTRONIC MAIL

[75] Inventor: Jeffrey A. Bull, Nampa, Id.

[73] Assignee: Micron Electronics, Inc., Nampa, Id.

[21] Appl. No.: 08/956,180

[22] Filed: Oct. 22, 1997

[51] Int. Cl.$^7$ ................................................. G06F 17/50
[52] U.S. Cl. ................................ 705/11; 705/32; 705/900; 705/11; 364/468.18; 364/705.06; 235/377
[58] Field of Search ........................... 705/32, 9, 11, 705/10; 364/468.18, 705.06; 235/377

[56] References Cited

U.S. PATENT DOCUMENTS

| | | | |
|---|---|---|---|
| 4,819,162 | 4/1989 | Webb, Jr. et al. | 364/401 |
| 5,068,787 | 11/1991 | Pipella et al. | 364/406 |
| 5,182,705 | 1/1993 | Barr et al. | 705/11 |
| 5,459,657 | 10/1995 | Wynn et al. | 705/32 |
| 5,508,977 | 4/1996 | Tymn | 368/10 |
| 5,646,839 | 7/1997 | Katz | 379/93.01 |
| 5,696,702 | 12/1997 | Skinner et al. | 364/551.01 |
| 5,764,916 | 6/1998 | Busey et al. | 395/200.57 |
| 5,842,181 | 11/1998 | Fanjoy | 705/32 |

OTHER PUBLICATIONS

Bandy, Brian and Ben Smith "YAK—Winsock Personal Chat Program and Multi–Document Text Editor–Version 1.0 beta", 1996, at bbandy@whc.net and benbean@ionet.net..

Lessing, Tom "TomChat version 4.02 for Win95 and WinNT 4.x" at 9518132@ml.petech.ac.za.

ICQ Web site (http://www.icq.com/support/) Guided Tour—Product's Features, Feb. 22, 1999.

*Primary Examiner*—James P. Trammell
*Assistant Examiner*—Mussie K. Tesfamariam
*Attorney, Agent, or Firm*—Dorsey & Whitney LLP

[57] ABSTRACT

A method and system in a computer system for tracking the productivity of technical support specialists in a call center environment. The system displays on a display device a form for entry of normal activity and exceptions to normal activity. The system receives from the technical support specialist indications of normal activity and exceptions. Each indication of an exception includes its type and its length. The system stores indications of the normal activity and exceptions. Upon receiving a request to transmit an exception report, the system retrieves the stored indications and formats the stored indications into an electronic mail message. The system then presents the formatted electronic mail message to the technical support specialist so that modifications to formatted electronic mail message can be made. Finally, the system sends the electronic mail message to a central location so that electronic mail messages from multiple technical support specialists can be collected and processed.

22 Claims, 11 Drawing Sheets

METHOD AND SYSTEM FOR TRACKING EMPLOYEE PRODUCTIVITY VIA ELECTRONIC MAIL

TECHNICAL FIELD

The present invention relates generally to computer systems and, in particular, to a computer system for tracking employee productivity.

BACKGROUND OF THE INVENTION

Various types of organizations (e.g., developers of computer programs and manufacturers of computer systems) provide telephonic customer support services. To use such customer support services, a customer places a call to a customer support center for the organization. When the call is received at the customer support center, the call is distributed to one of the available customer service representatives. Each customer service representative typically has a computer system through which the representative can access information needed to respond to a customer. These computer systems are typically personal computers that are connected through a network to a server computer system. The server computer system provides access to the information needed to respond to the customers. For example, manufacturers of personal computers typically provide technical support via telephone to their customers. When a technical support specialist of the manufacturer is routed a telephone call, the specialist assesses the needs of the customer and prepares and provides an appropriate response, such as how to repair the configuration file of the customer's computer system.

The cost of providing such a customer service center for technical support can be very high. In addition to the salaries of each of the technical support specialists, the manufacturer typically spends significant amounts on training the technical support specialists and on providing computer systems to aid the specialists in servicing the customers. Therefore, it is very important that these highly trained specialists operate as productively as possible. Unfortunately, it has been very difficult to assess the productivity of technical support specialists. In particular, technical support specialists may work on various tasks other than receiving incoming calls from customers. For example, in order to respond to a customer, the technical support specialist may need to spend some time researching the customer's problem. The specialist may need to present the customer's problem to an experienced systems programmer who can then help provide a solution to the problem. Also, the technical support specialist often needs to place a follow-up call to the customer to provide the response. In addition, technical support specialists may need to attend various meetings and classes when they would otherwise be available to receive incoming calls from customers. For example, a technical support specialist may need to attend a class on a new feature of a computer system that will soon be sold by the manufacturer.

Because the technical support specialists can spend their day performing a variety of tasks, it has been difficult to assess their productivity. Consequently, supervisors of the technical support specialists have in the past requested that each specialist provide a tracking of the time in which the technical support specialist was not available to respond to an incoming call. The technical support specialists would typically hand write a log of their time spent other than answering incoming calls and forward the log to the supervisor. The supervisor would then correlate the information in the logs and attempt to evaluate the productivity of the technical support specialist. Using such information, the supervisor can identify ways to improve the availability of specialists to receive incoming calls. For example, the supervisor may request that systems programmers provide prompt attention or that additional specialists be hired.

Unfortunately, such an informal technique for the tracking time of specialists has serious disadvantages. First, if specialists do not record their time in the logs contemporaneously with the activity, then the accuracy of the logs suffers. Second, different specialists may record different levels of detail. For example, one specialist may record that time was spent generally on research, while another specialist may record that time was spent reviewing manuals to respond to a configuration file problem, talking to a systems programmer, and placing a follow-up call to the customer. Third, because the logs are handwritten, the supervisor is likely not able to perform a meaningful analysis of the logs in a reasonable amount of time.

SUMMARY OF THE INVENTION

An embodiment of the present invention provides a method and system for tracking the productivity of representatives in a call center. The productivity tracking ("PT") system is installed at each representatives' computer system. The PT system provides data entry fields through which the representative can record the start and end of periods of activity and record exceptions to normal activity. Each exception indicates a type and a length. The PT system at the representative's request, at another's request, or at a predefined time prepares an electronic mail message that includes an indication of each of the periods of activity and each of the exceptions. The PT system then sends the electronic mail message to a central location, which may be the computer system of the representative's supervisor. The PT system thus facilitates the entry of exceptions in a way that increases the chances that representatives will record each exception contemporaneously with the exception. The PT system also enforces a uniform level of detail and facilitates analysis.

BRIEF DESCRIPTION OF THE DRAWINGS

FIGS. 3A–3F illustrate the display of the PT window through which a user can enter the time exception information.

DETAILED DESCRIPTION OF THE INVENTION

An embodiment of the present invention provides a method and system for tracking the productivity of technical support specialists in a call center environment. The productivity tracking ("PT") system receives from a specialist indications of time spent on normal activity and indications of exceptions to normal activity (i.e., abnormal activity). Each indication of normal and abnormal activity includes the amount of time spent by the specialist on that activity and, for the abnormal activity, the type of the exception. The PT system stores these indications. At a designated time or in response to a request (e.g., the specialist's request), the PT system prepares an electronic mail message that includes an indication of the received normal and abnormal activity. The PT system then sends the electronic mail message to a central location, such as the computer system of the specialist's supervisor, so that electronic mail messages from multiple representatives can be collected and processed. The PT system thus allows for the electronic collection of records of activity and transmitting of the recorded information using existing electronic mail facilities.

In one embodiment, the PT system, in response to a user request, displays on a display device a window for entry of normal activity and exceptions to normal activity. The PT system allows the user to enter time periods of various exceptions that have occurred during the course of the day. The PT system stores each of the exceptions in an exception file. The PT system also allows the user to enter periods of normal activity using a "timecard" metaphor. The PT system stores the timecard information in a timecard file. At a predetermined time or on an ad hoc basis, the PT system may generate a request to transmit a productivity report. In response to this request, the PT system retrieves the stored timecard information and the stored exceptions and formats them into an electronic mail message. The PT system then presents the formatted electronic mail message to the user so that modifications to the formatted electronic mail message can be made. The PT system then sends the electronic mail message to a central location that is either predefined or designated by the user so that electronic mail messages from multiple users can be collected and analyzed.

Figure 1:
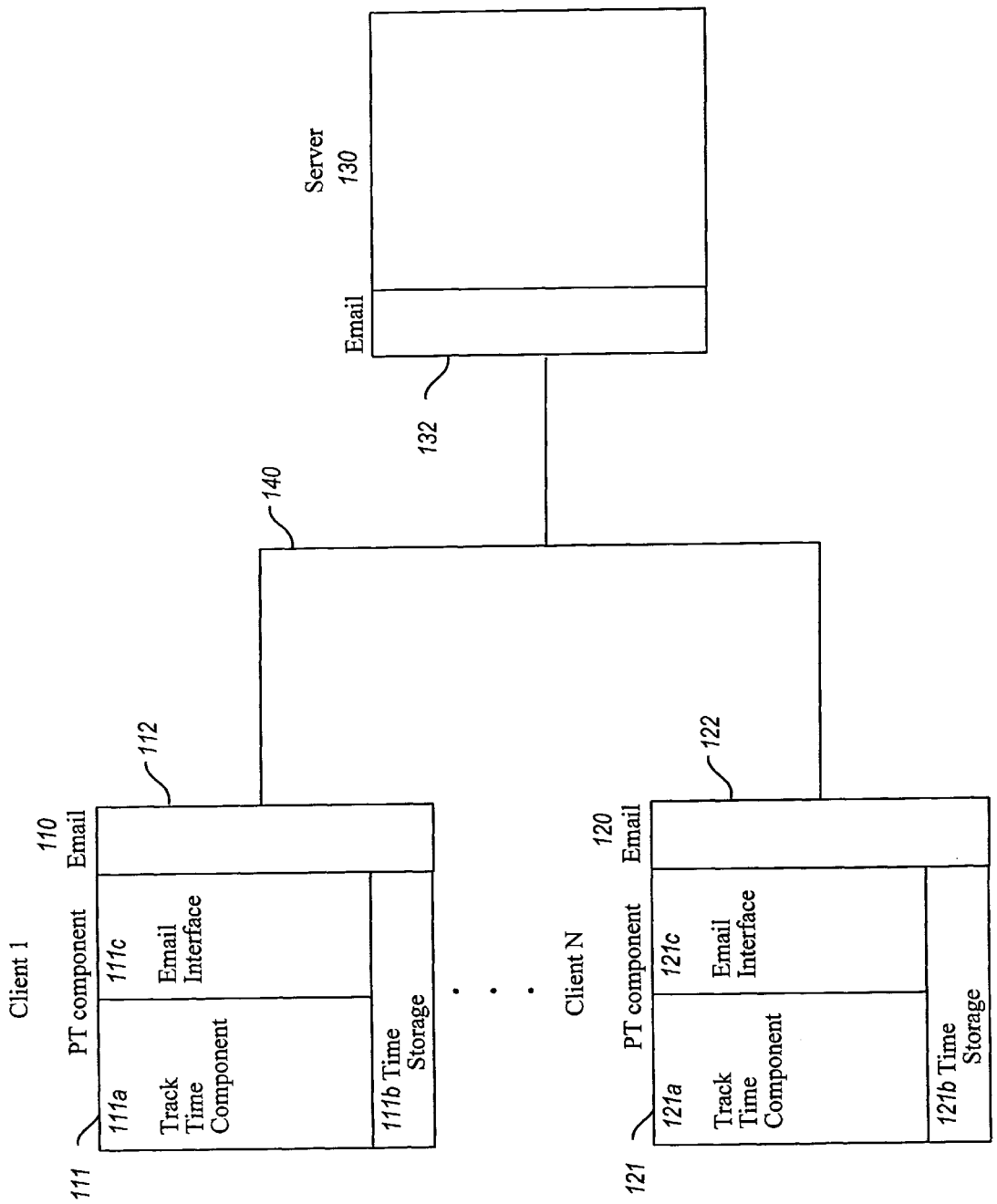
FIG. 1 is a block diagram illustrating a typical computing environment in which the PT system operates.

FIG. 1 is a block diagram illustrating a typical computing environment in which the PT system operates. The computing environment includes client computers 110, 120 and server computer 130. The computers may be any of a variety of computers that include a central processing unit, memory, storage devices, and various I/O devices. The computer systems are connected through a local area network 140 through which the computers can exchange information. However, one skilled in the art would appreciate that the computers could be connected via various mechanisms such as a wide area network or the Internet. Each computer system includes a standard electronic mail message component 112, 122, 132. These electronic mail message components allow a user to format an electronic mail, send an electronic mail message to another computer, and receive and display electronic mail messages. Each client computer 110, 120 includes a productivity tracking ("PT") component 111. The PT component comprises a track time component 111a, time storage area 111b, and an electronic mail interface component 111c. The track time component coordinates the receiving and storing of timecard and exception information in the time storage area. The electronic mail interface component retrieves timecard and exception information stored in the time storage area and directs the electronic mail system to transmit an electronic mail message with timecard and exception information to the server computer. Although the recipient of the electronic mail message is referred to as a "server computer," one skilled in the art would recognize that it could be another client computer.

Figure 2:
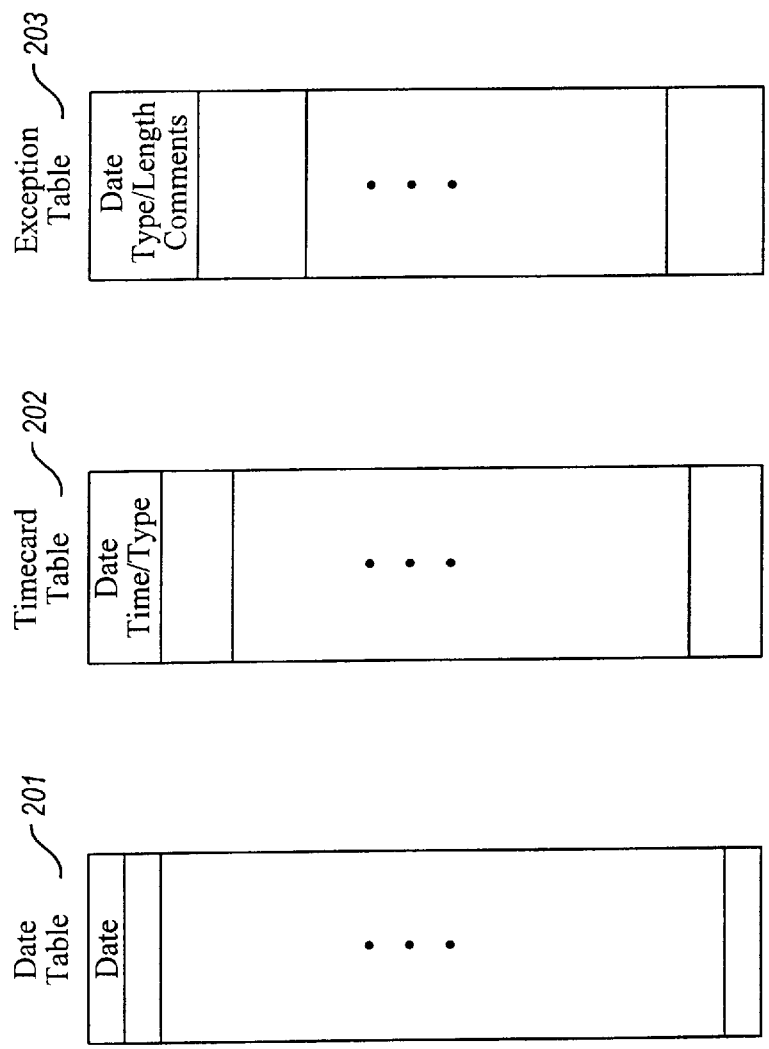
FIG. 2 illustrates the organization of the data in the time storage area.

FIG. 2 illustrates the organization of the data in the time storage area. The time storage area contains a date table 201, a timecard table 202, and an exception table 203. The date table contains an entry for each date for which the track time component has stored time information. By accessing the date table, the track time component can quickly determine whether time information for a particular date has been stored. The timecard table 202 contains an entry for each timecard event recorded by a user. A timecard event corresponds to the start of or the end of activity. Each entry in the timecard table contains the date, the time of the event, and the type of the event. The type of events include start of activity and end of activity. The exception table contains the exceptions received from the user. Each entry in the exception table contains the date of the exception, the type of the exception, the time period of the exception (i.e., length of exception), and various comments that the user may have entered to further explain the exception.

Figure 3A:
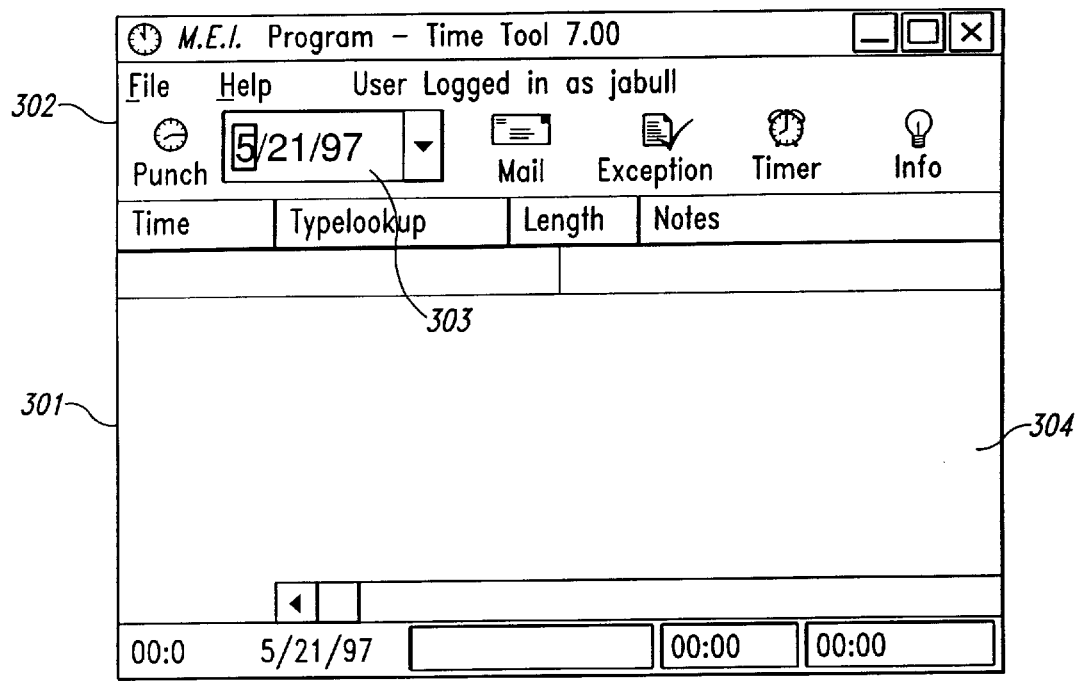
Figure 3B:
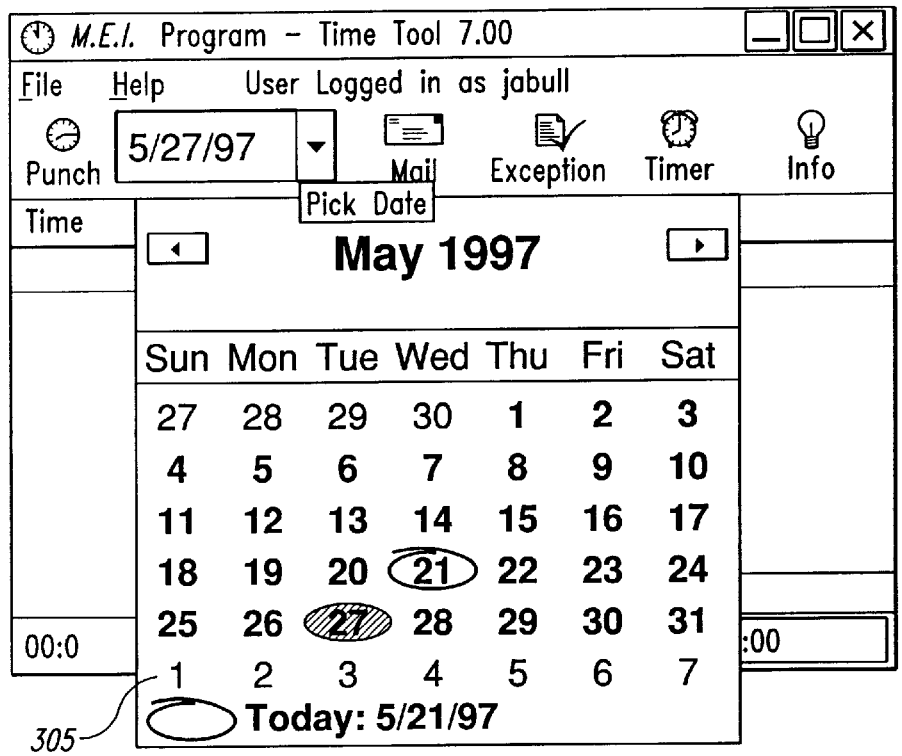
Figure 3C:
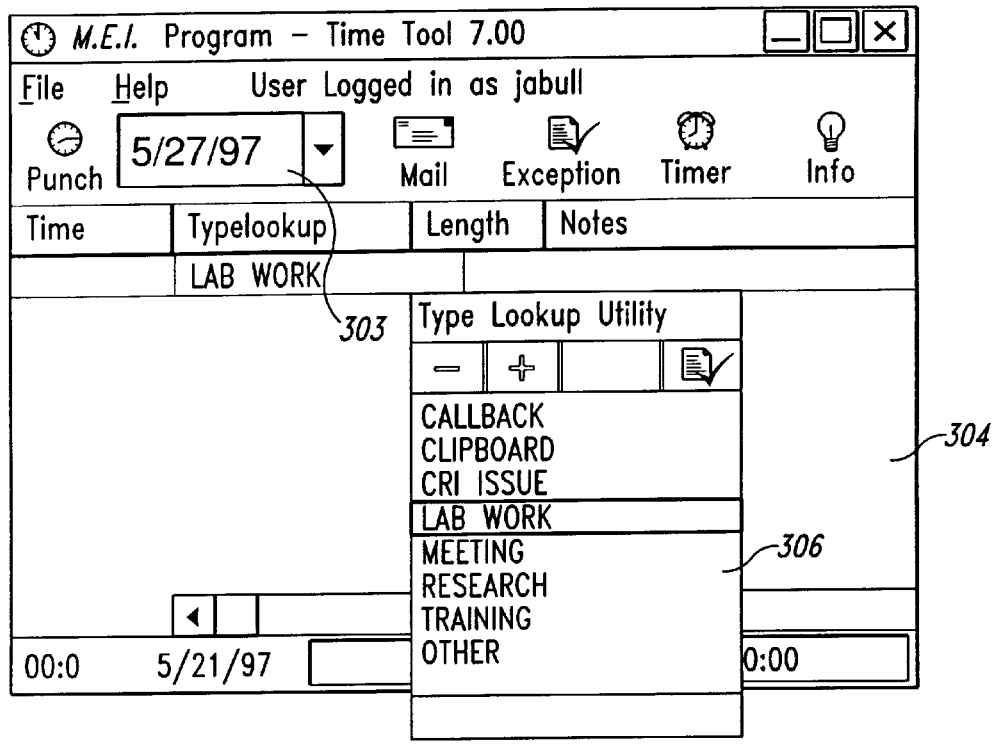
Figure 3D:
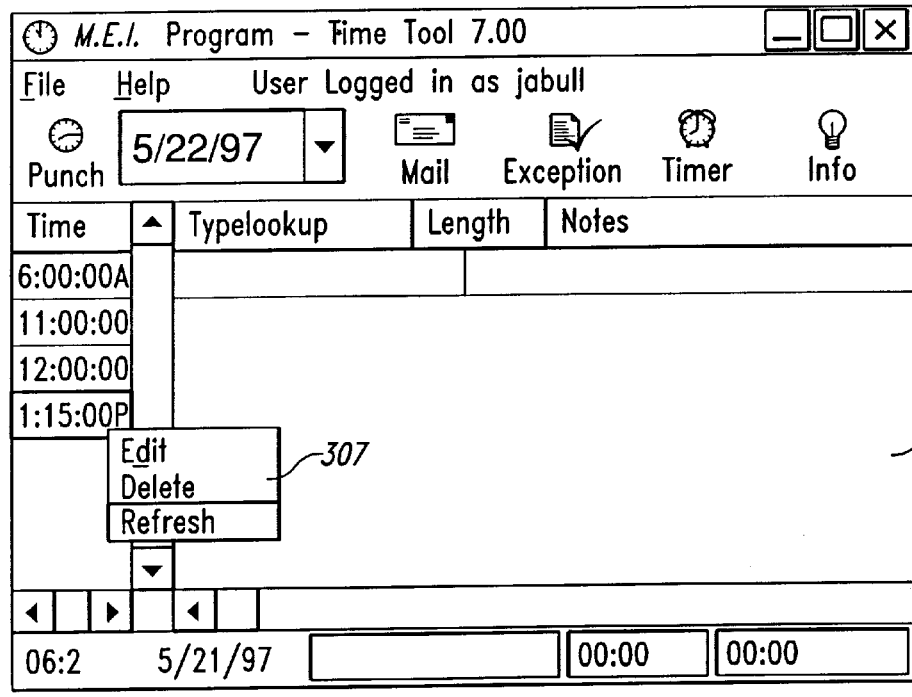
Figures 3E, 3F:
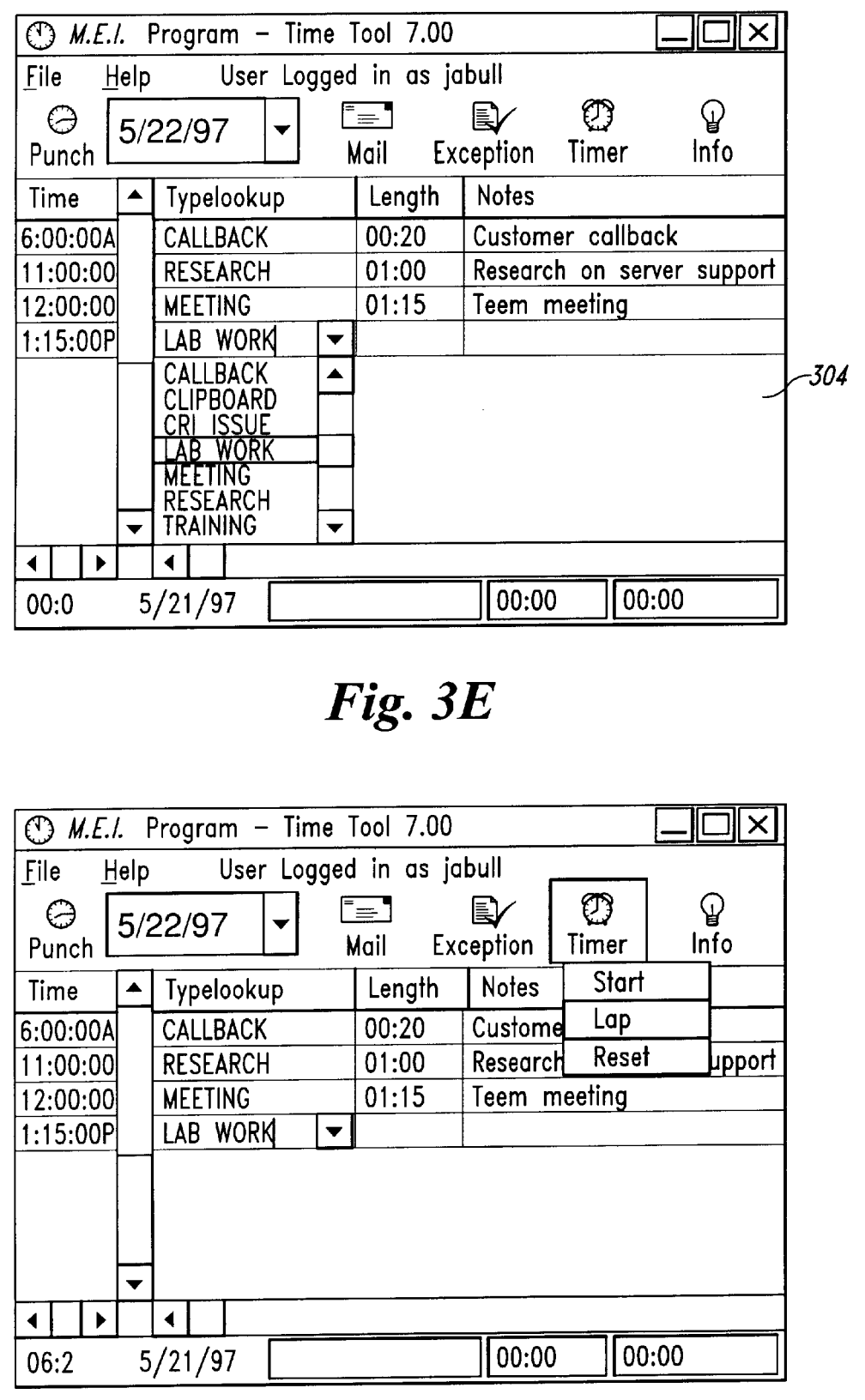

FIGS. 3A–3F illustrate the display of the window through which a user can enter the timecard and exception information. The PT window 301 contains various icons 302 through which the user can select various functions provided by the PT component. The icons include the punch icon, the mail icon, the exception icon, and the timer icon. When the punch icon is selected, the PT component records a timecard entry that indicates activity is either starting or ending. When the exception icon is selected, the PT component allows the user to input an exception. When the timer icon is selected, the PT component allows the user to time the length of an activity. When the mail component is selected, the PT component formats an electronic mail message for the selected date. The date window 303 indicates the selected date. The timecard entries and exceptions for the selected date are displayed in the display area 304. As shown in FIG. 3A, no timecard entries or exceptions for the selected date (i.e., 5/21/97) are displayed. The display area includes four columns. The "Time" column displays the timecard entries. The "Typelookup" column displays the type of each recorded exception; the "Length" column displays the length of the exception; and the "Notes" column displays comments relating to the exception. FIG. 3B illustrates the selection of the date. When the user selects the dropdown button to the right of the selected date, the PT component displays a calendar for the month corresponding to the selected date. The user can use the calendar to select another date. When a date is selected, then the PT component updates the date window. If the selected date has associated timecard or exception information, then the PT component displays that information in display area 304. In this example, the user selects "5/27/97" as the date. FIG. 3C illustrates the display of a window containing the types of exceptions and another selected date. The selected date is shown in the date window 303. When a user selects the exception icon, the window 306 of exception types is displayed. The user can then select the appropriate exception type which is displayed in display area 304 in the Typelookup column. FIG. 3D illustrates the functions of the Time column. The Time column contains the times in which the user either started (i.e., "punched in") or ended (i.e., "punched out") of activity. The PT component also allows the user to modify the Time column as indicated by the pop-up window 307. The time column indicates that the user started activity at 6:00 a.m., stopped activity at 11:00 a.m., restarted activity at 12:00 p.m., and ended that activity at 1:15 p.m. FIG. 3E illustrates a typical contents of display area after the user has entered several exceptions and punched various times. FIG. 3F illustrates the use of the timer icon. The current running timer is displayed at the bottom of the window area.

Figure 4:
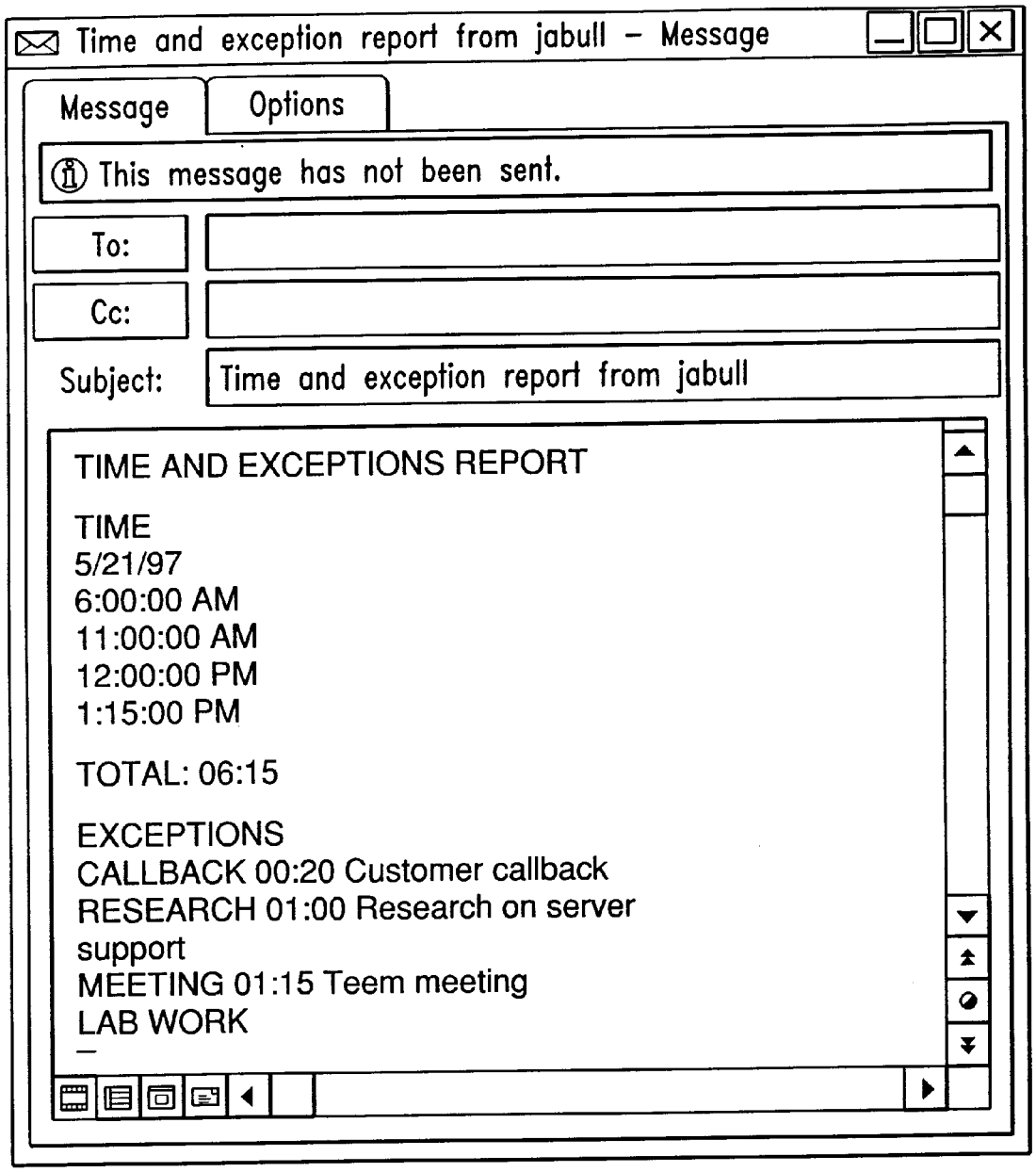
FIG. 4 is an example of an electronic mail message.

FIG. 4 is an example of an electronic mail message. The electronic mail message is generated from the data contained in the timecard table and the exception table for the selected date. This electronic mail message corresponds to the data displayed in FIG. 3F. The PT component can generate the electronic mail message when the user selects the mail icon or when a predetermined time occurs (e.g., 5:00 p.m.). The PT component in this example allows the user to edit and address the electronic mail message. Alternatively, the PT component could automatically send the electronic mail message to a designated addressee (e.g., the user's supervisor) at a designated time for the current date.

Figure 5:
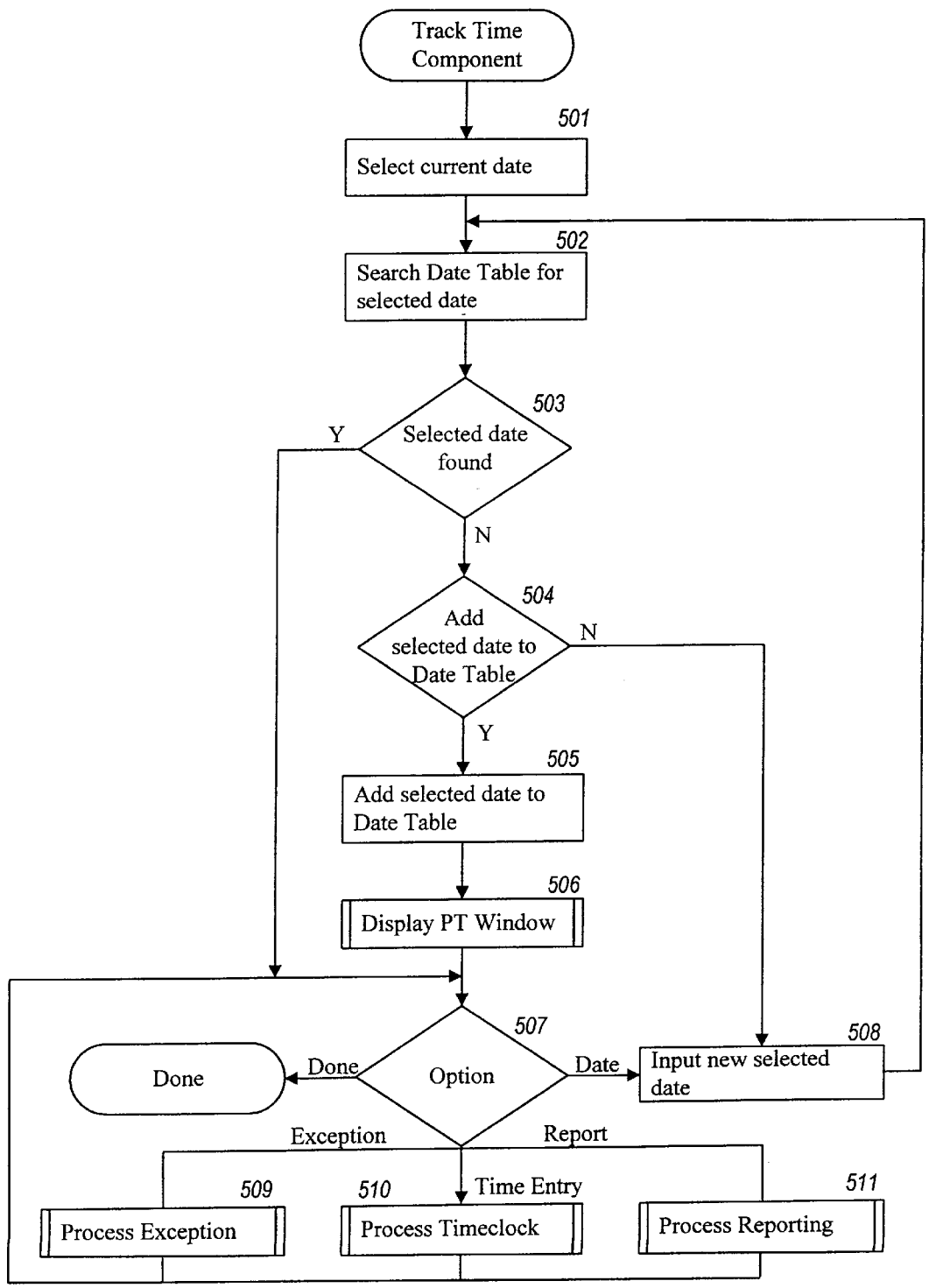
FIG. 5 is a flow diagram of an implementation of the track time component.

FIG. 5 is a flow diagram of an implementation of the track time component. The track time component controls the displays of the PT window, the entering of the timecard and exception information, and the sending of the electronic mail message. In step 501, the component selects the current date as the initial date. In steps 502–511, the component loops processing various data entry options for the selected date. In step 502, the component searches the date table for the selected date. In step 503, if the selected date is found, then the component continues at step 506, else the component continues at step 504. In step 504, the component prompts the user to determine if the selected date should be added to the date table. If so, the component continues at step 505, else the component continues at step 508. In step 505, the component adds the selected date to the date table. In step 506, the component displays a window indicating the current timecard entries and exceptions for the selected date and allows the user to select an option for further processing. In steps 506–511, the component loops processing the various options. The options can include to change the selected date, to modify an exception, to modify a time entry, to report the time entries and exceptions, or to complete. If the option is to select a new date, then, in step 508, the component inputs and selects a new date and loops to step 502 to search the date table for the selected date. If the option is to update the exceptions, then, in step 509, the component invokes the process exception routine. If the option is to update the timecard entries, then, in step 510, the component invokes the routine to process the timecard entries. If the option is to report the timecard and exception information, then in step 511, the component invokes the process reporting routine.

Figure 6:
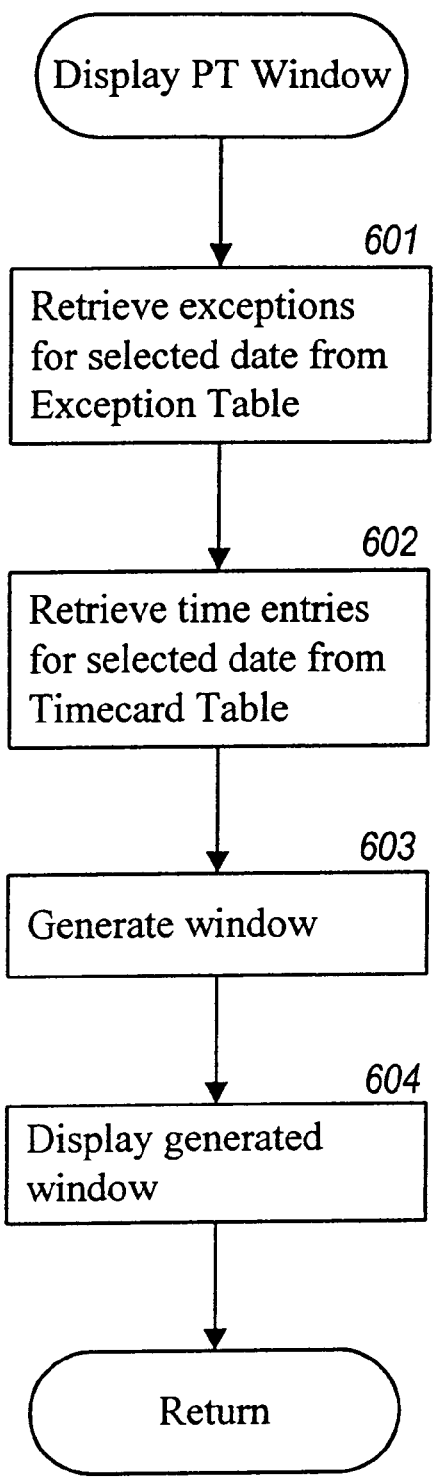
FIG. 6 is a flow diagram of the routine to display the PT window.

FIG. 6 is a flow diagram of the routine to display the PT window. The routine displays the timecard and exception information in four columns as discussed above. The routine uses the selected date to retrieve the information from the time storage area. In step 601, the routine retrieves exceptions for the selected date from the exception table. In step 602, the routine retrieves the timecard entries for the selected date from the timecard table. In step 603, the routine generates a window containing the retrieved exceptions and timecard entries. In step 604, the routine displays the generated window and returns.

Figure 7:
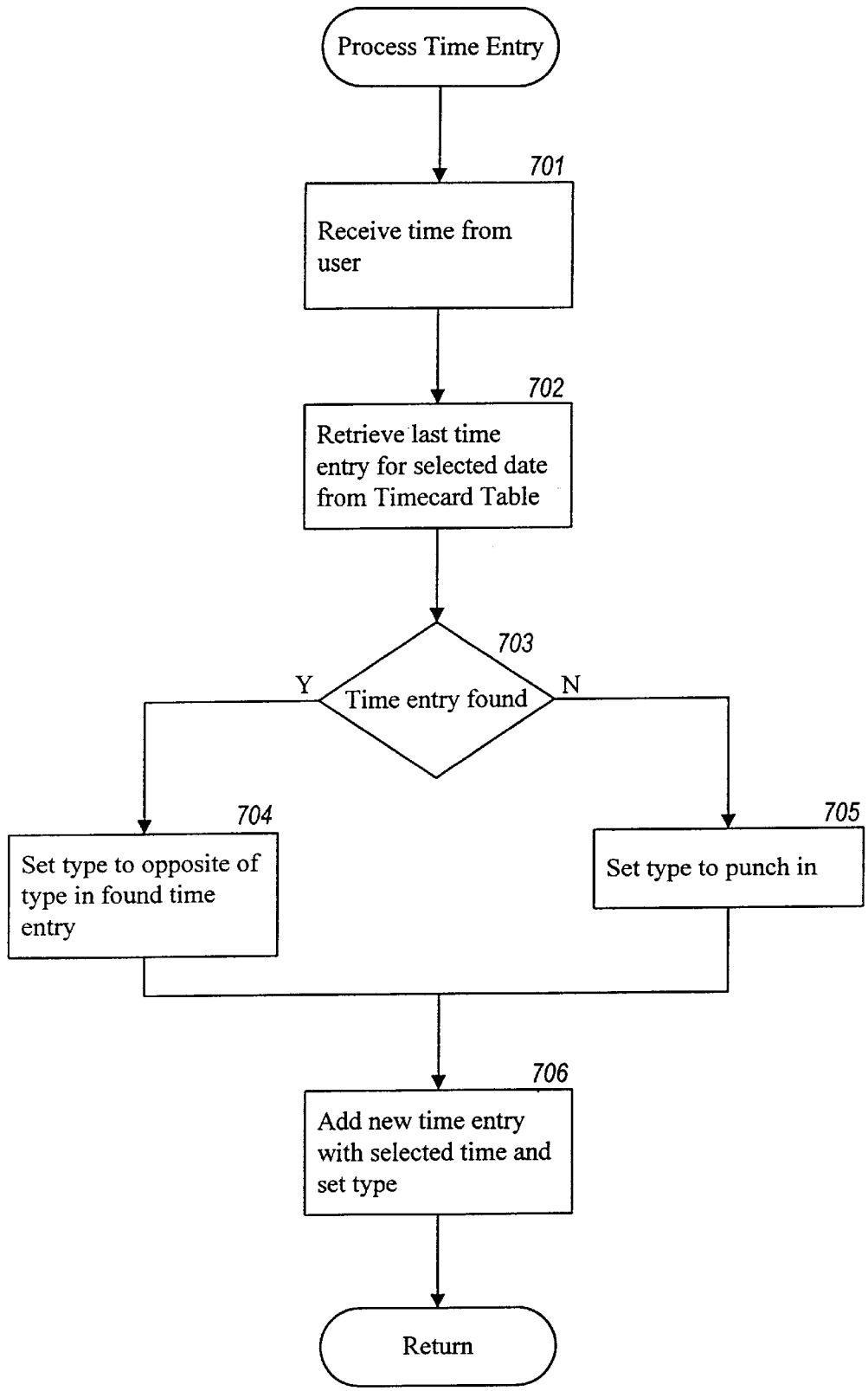
FIG. 7 is a flow diagram of the routine to process time entries.

FIG. 7 is a flow diagram of the routine to process time entries. This routine uses the timecard metaphor in that each "punch" toggles between the start of and the end of activity. Although not shown in the diagram, the routine also allows the user to modify the displayed timecard entries. This routine is invoked when the user selects the punch icon. In step 701, the routine retrieves a time from the user. The time could default to the current time. In step 702, the routine retrieves the last timecard entry for the selected date from the timecard table. In step 703, if such a timecard entry is found in the timecard table, then the routine continues at step 704, else the routine continues at step 705. In step 704, the routine sets the type to the opposite type that is found in the timecard entry. That is, if the type of the timecard entry indicates that the user is currently punched in, then the opposite type is that the user is punched out. In step 705, the routine sets the type to punch in, because this is the first timecard entry for the selected date. In step 706, the routine adds a new timecard entry to the timecard table with the selected time and the set type and returns. One skilled in the art would appreciate that this routine could be modified to accommodate activity that spans two dates (e.g., from 11:00 p.m. to 7:00 a.m.).

Figure 8:
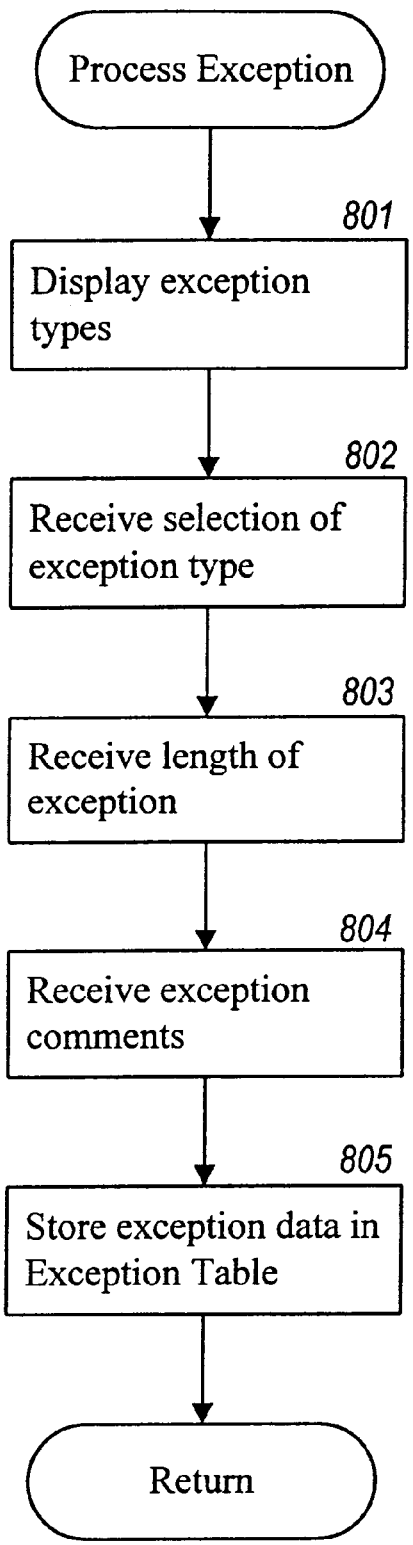
FIG. 8 is a flow diagram of a routine to process exceptions.

FIG. 8 is a flow diagram of a routine to process exceptions. This routine allows the user to enter the exception information into the three exception columns. The routine then stores the exception information in the exception table. Although not shown in the diagram, the routine also allows a user to modify the exceptions. The routine is invoked when the user selects the exception icon. In step 801, the routine displays the exception types, which may include callback, clipboard, meeting, research, and training. In step 802, the routine receives a selection of the exception type from a user. In step 803, the routine receives a length of the exception. This length may default to the current value of the timer. In step 804, the routine receives exception comments from the representative. In step 805, the routine stores an exception entry into the exception table and returns.

Figure 9:
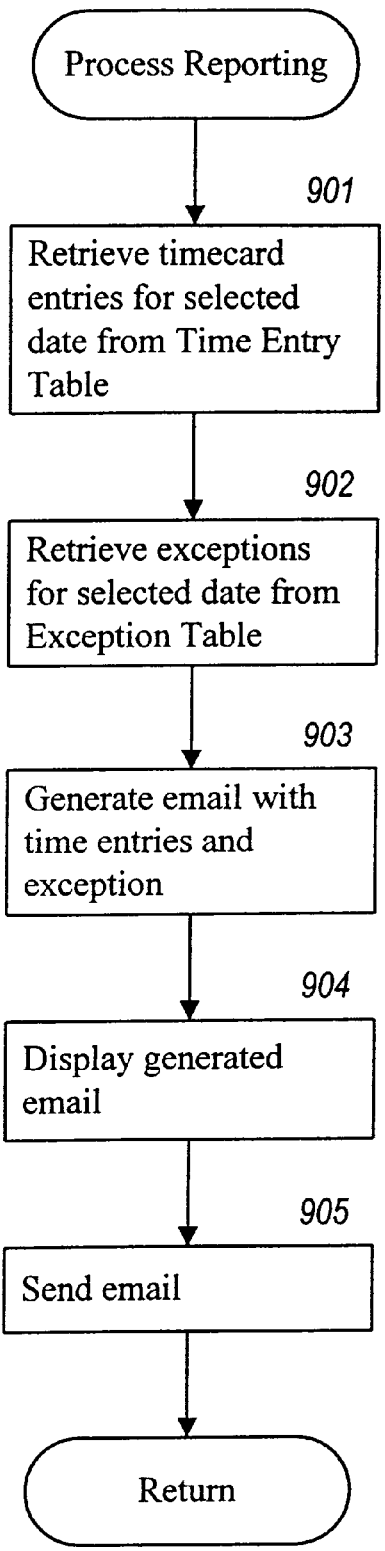
FIG. 9 is a flow diagram of the process reporting routine.

FIG. 9 is a flow diagram of the process reporting routine. The process reporting routine is an embodiment of the electronic mail interface of the PT component. The routine is invoked when the user invokes the mail icon. Alternatively, this routine can be invoked at predetermined times such as at 6:00 p.m. every day or can be invoked at the request of another computer system (e.g., a supervisor's computer system). In step 901, the routine retrieves the timecard entries for the selected date from the timecard table. In step 902, the routine retrieves the exceptions for the selected date from the exception table. In step 903, the routine generates an electronic mail message with the time entries and the exceptions. In step 904, the routine displays the generated electronic mail message to the user and allows the user to make modifications to the message. In step 905, the routine sends the generated electronic mail message via the electronic mail system and returns.

Although the present invention has been described in terms of various embodiments, it is not intended that the invention be limited to these embodiments. Modification within the spirit of the invention will be apparent to those skilled in the art. The scope of the present invention is defined by the claims that follow.

What is claimed is:

1. A method in a computer system for contemporaneously tracking the productivity of technical support specialists in a call center environment, the method comprising:

displaying on a display device a form for entry of exceptions to normal activity;

using a timer to time the length of the exception to normal activity;

receiving from the technical support specialist indications of at least one exception, each indication including a type of the exception and the time length of the exception;

storing each of the indications of the plurality of exceptions;

receiving a request to transmit an exception report; and in response to receiving the request to transmit an exception report, retrieving the stored indications;

formatting the stored indications into an electronic mail message;

presenting the formatted electronic mail message to the technical support specialist so that modifications to formatted electronic mail message can be made;

sending the electronic mail message to a central location so that electronic mail messages from multiple technical support specialists can be collected and processed; and analyzing the indications to determine productivity.

2. The method of claim 1 including receiving from the technical support specialist indications of timecard entries, each of a timecard entry including an associated time and wherein the formatted electronic mail message includes the indications of the timecard entries.

3. The method of claim 1 including displaying types of exception so that the technical support specialist can select the type of an exception.

4. A method in a computer system for contemporaneously tracking the productivity of representatives in a call center, the method comprising:

timing the length of time the representative is engaging in an exception to normal activity;

receiving from the representative an indication of exceptions to normal activity that includes indicating a type and a time length of each exception;

preparing an electronic mail message that includes an indication of each of the received exceptions, each indication indicating the type and length of the exception; and sending the electronic mail message to a central location for analysis of productivity.

5. The method of claim 4 including presenting the prepared electronic mail message to the representative for modification.

6. The method of claim 5 wherein the sending sends the modified electronic mail message.

7. The method of claim 4 wherein the central location is a computer system of a supervisor of the representative.

8. The method of claim 4 wherein the preparing is in response to receiving an indication from the representative to send the electronic mail message.

9. The method of claim 4 wherein the preparing automatically occurs at predefined times.

10. The method of claim 4 including storing each received exception in an exception table.

11. The method of claim 4 including receiving timecard entries and wherein the prepared electronic mail message contains an indication of each timecard entry.

12. The method of claim 11 wherein the timecard entries indicate periods of normal and exceptions to normal activity.

13. A computer system for tracking the productivity of representatives in a call center, comprising:

a timer component for timing the length of time the representative is engaging in an exception to normal activity;

a track time component for receiving from the representative indications of exceptions to normal activity that include a type of exception and a length of time for each exception to normal activity;

a time storage component for storing the received exceptions; and an electronic mail interface component for preparing an electronic mail message that includes the indication of each of the received exceptions and for sending the electronic mail message to a central location for analysis of productivity.

14. The system of claim 13 wherein the electronic mail interface component presents the prepared electronic mail message to the representative for modification.

15. The system of claim 14 wherein the electronic mail interface component sends the modified electronic mail message.

16. The system of claim 13 wherein the electronic mail interface component sends the electronic message to a supervisor of the representative.

17. The system of claim 13 wherein the electronic mail interface component prepares the electronic mail message in response to receiving an indication from the representative to send the electronic mail message.

18. The system of claim 13 wherein the electronic mail interface component prepares the electronic mail message automatically at predefined times.

19. The system of claim 13 wherein the time storage component includes an exception table.

20. The system of claim 13 wherein the track time component receiving timecard entries and wherein the prepared electronic mail message contains an indication of each time entry.

21. The system of claim 20 wherein the timecard entries indicate periods of activity.

22. The system of claim 13 wherein the track time component displays a list of types of exceptions.

* * * * *